(12) United States Patent
Zhu

(10) Patent No.: US 11,426,862 B2
(45) Date of Patent: Aug. 30, 2022

(54) GUIDERAIL FOR UNDERSLUNG ROBOT, UNDERSLUNG ROBOT AND OPERATING SYSTEM THEREOF

(71) Applicants: HANGZHOU YAMEILIJIA TECHNOLOGY CO., LTD., Hangzhou (CN); Jianqiang Zhu, Hangzhou (CN)

(72) Inventor: Jianqiang Zhu, Hangzhou (CN)

(73) Assignee: Hangzhou Yameilijia Technology Co., Ltd, Zhejiang (CN)

( * ) Notice: Subject to any disclaimer, the term of this patent is extended or adjusted under 35 U.S.C. 154(b) by 405 days.

(21) Appl. No.: 16/619,150

(22) PCT Filed: Jun. 11, 2018

(86) PCT No.: PCT/CN2018/090706
§ 371 (c)(1),
(2) Date: Dec. 4, 2019

(87) PCT Pub. No.: WO2018/224048
PCT Pub. Date: Dec. 13, 2018

(65) Prior Publication Data
US 2020/0164502 A1    May 28, 2020

(30) Foreign Application Priority Data
Jun. 9, 2017   (CN) .......................... 201710434072.0

(51) Int. Cl.
*B25J 5/00* (2006.01)
*B25J 5/02* (2006.01)
*B25J 9/00* (2006.01)

(52) U.S. Cl.
CPC .............. *B25J 5/02* (2013.01); *B25J 9/0009* (2013.01)

(58) Field of Classification Search
USPC ................................................ 700/245–264
See application file for complete search history.

(56) References Cited

U.S. PATENT DOCUMENTS

| 5,088,176 A | 2/1992 | Koga |
| 5,643,094 A * | 7/1997 | Macri ............... A63B 24/0003 472/92 |
| 6,059,169 A * | 5/2000 | Nihei ................... B23K 11/314 901/42 |
| 6,390,756 B1 * | 5/2002 | Isaacs ..................... B65H 1/30 53/235 |

(Continued)

FOREIGN PATENT DOCUMENTS

| CN | 1894146 | 1/2007 |
| CN | 203946537 | 11/2014 |

(Continued)

OTHER PUBLICATIONS

International Search Report issued in application No. PCT/CN2018/090706 dated Aug. 28, 2018.

*Primary Examiner* — Jonathan L Sample
(74) *Attorney, Agent, or Firm* — Hogan Lovells US LLP

(57) ABSTRACT

Disclosed are a guiderail of an underslung robot, an underslung robot and an operating system thereof. The guiderail of an underslung robot includes: a main guiderail, suspended in the air by a support frame; and an auxiliary guiderail, communicating with the main guiderail and suspended in the air by a support frame. An intersection of the main guiderail and the auxiliary guiderail is provided with a gap through which a traveling underslung robot can pass. The guiderail further includes path indicators mounted on the main guiderail and the auxiliary guiderail. An underslung robot, comprising: wheels for bearing the underslung robot, wherein at least one of the wheels is a power wheel; and two booms, wherein the top of the booms is connected to the wheels, the bottom of the booms is connected to a frame of the underslung robot.

17 Claims, 2 Drawing Sheets

(56) References Cited

U.S. PATENT DOCUMENTS

| | | | | |
|---|---|---|---|---|
| 8,396,584 | B2* | 3/2013 | Tanaka | B65G 1/137 |
| | | | | 700/214 |
| 8,843,234 | B2* | 9/2014 | Tao | B25J 9/1674 |
| | | | | 700/250 |
| 2002/0121291 | A1* | 9/2002 | Daum | B60S 3/008 |
| | | | | 134/123 |
| 2003/0038065 | A1* | 2/2003 | Pippin | B07C 3/087 |
| | | | | 198/370.01 |
| 2007/0138466 | A1* | 6/2007 | Lee | H01L 21/67769 |
| | | | | 257/48 |
| 2008/0009970 | A1* | 1/2008 | Bruemmer | G05D 1/0088 |
| | | | | 700/245 |
| 2008/0281717 | A1* | 11/2008 | Kortelainen | B65G 1/0464 |
| | | | | 705/28 |
| 2011/0014371 | A1* | 1/2011 | Herre | B05B 12/1418 |
| | | | | 901/50 |
| 2012/0152877 | A1* | 6/2012 | Tadayon | F24S 50/20 |
| | | | | 901/30 |
| 2017/0313514 | A1* | 11/2017 | Lert, Jr | B65G 1/0492 |
| 2018/0029797 | A1* | 2/2018 | Hance | B25J 5/007 |
| 2018/0272522 | A1* | 9/2018 | Doll | B25J 5/02 |

FOREIGN PATENT DOCUMENTS

| | | |
|---|---|---|
| CN | 105173504 | 12/2015 |
| CN | 205377160 | 7/2016 |
| CN | 206178170 | 5/2017 |
| CN | 107139161 | 9/2017 |
| CN | 206982657 | 9/2018 |

* cited by examiner

GUIDERAIL FOR UNDERSLUNG ROBOT, UNDERSLUNG ROBOT AND OPERATING SYSTEM THEREOF

CROSS-REFERENCE TO RELATED APPLICATION

The present disclosure claims the priority of the Chinese patent application with the filing number CN201710434072.0, filed on Jun. 9, 2017 with the Chinese Patent Office, entitled "Guiderail for Underslung Robot, Underslung Robot and Operating System thereof", the entirety of which is incorporated herein by reference.

TECHNICAL FIELD

The present disclosure relates to a guiderail for an underslung robot, an underslung robot and an operating system thereof.

BACKGROUND ART

The existing walking robots substantially walk on the ground. A Chinese patent with the filing number CN201610006170.X discloses a method and an apparatus for correcting driving route deviations of a robot terminal. The method includes: acquiring position identification information of a robot terminal driving in a work place, wherein the work place is provided with a plurality of position points, and the robot terminal collects position identification information at each position point; according to the acquired position identification information, calculating a driving route angle of the robot terminal in the work place and a current position of the robot terminal; according to the driving route angle and the current position of the robot terminal, determining whether the driving route of the robot terminal is consistent with a preset driving route; and correcting the driving route of the robot terminal when detecting that the driving route of the robot terminal deviates from the preset driving route. In the deviation correcting process above, the driving state of the robot terminal can be effectively and rapidly obtained, and the deviations are timely corrected in the case of a driving route deviation, thereby substantially improving the work efficiency of the robot terminal, and reducing the fault incidence rate caused by path deviations.

In order to be capable of unloading goods into grids, a Chinese patent with the filing number CN201510433995.5 also discloses parcel sorting system and method, which solve the problem that the parcel sorting efficiency needs to be improved in the prior art. The parcel sorting system includes a parcel sorting device and a parcel collecting device, wherein the parcel sorting device is provided with a plurality of parcel inspection inlets and a plurality of parcel outlets; the parcel collecting device is located just under the parcel sorting device; the plurality of parcel outlets on the parcel sorting device are respectively communicated with the parcel collecting device; the plurality of parcel outlets are respectively located in the middle or/and the edge of the parcel sorting device; storing devices are arranged on the parcel collecting device and are respectively located under individual parcel outlets, and the diameter of each storing device is larger than the diameter of each parcel outlet. With use of this method, the parcel sorting efficiency can be obviously improved, the implementation is convenient, facilitating popularization and application.

From this technical solution, we know that the ground on which the robot walks needs to be set at the second floor or higher, in other words, the outlet of parcels must be provided lower than the ground on which the robot walks at least by one floor, and the floor also has to be retrofitted by drilling. If special design is made beforehand, there is no problem, while if the floor is retrofitted by drilling afterwards, the building probably will be affected, and at least the drilling project will be relatively big.

SUMMARY

In view of the above shortcomings, the present disclosure provides a guiderail for an underslung robot for an underslung robot to travel, without the need of retrofitting the floor by drilling, and being capable of unloading goods directly in a warehouse on the same floor during unloading.

A technical solution of the present disclosure is as follows:

a guiderail for an underslung robot, including:

a main guiderail, suspended in the air by a support frame;

an auxiliary guiderail, communicated with the main guiderail, wherein the auxiliary guiderail is suspended in the air by the support frame, and a gap is provided at a joint between the main guiderail and the auxiliary guiderail, wherein a traveling underslung robot can pass through the gap.

It should be noted that the underslung robot can be positioned by landmarks on the guiderail, and also can be positioned by a UWB wireless positioning base station. The guiderail being suspended in the air by the support frame means that one end of the support frame can be fixed to any building or the ground, and the other end is fixed with the guiderail. The underslung robot refers to a robot whose robot body is located under the guiderail.

It further should be noted that the main guiderail and the auxiliary guiderail are not strictly distinguished to be main or auxiliary, but rather represent different guiderails. Sometimes the auxiliary guiderail may become a main guiderail, while the main guiderail becomes an auxiliary guiderail.

Preferably, further included are road sign indicators, respectively installed on the main guiderail and the auxiliary guiderail, and the road sign indicators can be configured to allow the underslung robot to recognize where it is located.

It should be noted that the positions of the road sign indicators respectively installed on the main guiderail and the auxiliary guiderail are not specifically defined, while the position referred to in the present disclosure may be any orientation of the main guiderail and the auxiliary guiderail, as long as the underslung robot can be allowed to collect road sign indications. The road sign indicators are usually provided in positions close to the gap.

In order to obtain higher space utilization ratio, the main guiderail and the auxiliary guiderail are laid according to a plane, or laid in a three-dimensional space.

In order to accelerate a walking speed of the robot, an angle V between the main guiderail and the auxiliary guiderail is an acute angle.

Preferably, the angle V is smaller than 30 degrees. The smaller the angle is, the higher the walking speed of the robot can be.

In order to reduce vibration when the robot passes through the gap, the gap is in an elongated shape, and a length direction of the gap is the same as a length direction of the auxiliary guiderail, or the length direction of the gap is the same as the length direction of the main guiderail.

Preferably, the road sign indicator includes: a bar code, a two-dimensional code, a color block mark, a figure size mark, a figure color mark and/or a figure quantity mark.

Preferably, one end of the support frame is configured to fix the main guiderail and the auxiliary guiderail, and the other end is fixed on the ground or under ceiling of a building.

The present disclosure further discloses an underslung robot, including:

wheels, provided in a number of two, configured to carry the underslung robot, wherein at least one wheel is a power wheel controlled by a controller of the underslung robot, and the wheels can roll along the main guiderail or the auxiliary guiderail; the power wheel referred to herein means a wheel dynamically driven by a motor or the like;

two booms, wherein a top portion of each boom is connected with the wheel, a bottom portion of each boom is connected with a rack of the underslung robot, at least one boom, driven by a power system, is rotatable relative to the rack, so as to be capable of controlling a traveling direction of the wheels, and the power system is controlled by the controller of the underslung robot, wherein when the underslung robot travels from the main guiderail to the auxiliary guiderail, or travels from the auxiliary guiderail to the main guiderail, the booms can pass through the gap.

A road sign collecting sensor is further included, which is installed inside the underslung robot, and is capable of collecting information indicated by the road sign indicators, and the road sign collecting sensor is connected with the controller of the underslung robot.

It should be noted that the installation position of the road sign collecting sensor installed inside the underslung robot is not specifically defined, while the installation position referred to in the present disclosure is only required to enable the underslung robot to collect indications of the road sign indicators.

There are many options for the power system, for example, air cylinder or electromagnet as a power system, and preferably, it includes:

a steering motor, wherein its housing is fixed with the rack, a rotating shaft of the steering motor is fixed with the boom, and the steering motor is controlled by a controller of the underslung robot.

A deceleration motor or the like can be chosen as the steering motor.

In order to conveniently and accurately control a steering angle, preferably, the power wheel includes:

a servo motor, wherein its housing is fixed with the booms, a main shaft of the servo motor is fixed with a main shaft of the wheels.

There are also many options for the road sign collecting sensor, and preferably, the road sign collecting sensor includes a camera.

The present disclosure further discloses an operating system of an underslung robot, including the guiderail for the underslung robot and the underslung robot, and further including:

a server, which is in wireless communication with a plurality of underslung robots, wherein the server is capable of controlling the underslung robots to move forward, move backward and/or turn, and be capable of unloading goods in a designated position For the unloading structure of the underslung robot, reference can be made to a Chinese patent CN201620006569.3, entitled Sorting Robot.

For the road sign indicator and other parts, reference can be made to the Chinese patent CN201610006170.X, entitled Method and Apparatus for Correcting Driving Route Deviations of Robot Terminal, and the Chinese patent CN201510433995.5, Parcel Sorting System and Method.

The present disclosure has the beneficial effects of no need of retrofitting the building, high space utilization ratio, rapid walking speed of the robot and convenient unloading of the robot.

DETAILED DESCRIPTION OF EMBODIMENTS

Now the present disclosure is further described in conjunction with accompanying drawings:

As shown in the figures, a guiderail for an underslung robot includes:

a main guiderail 1, suspended in the air by a support frame;

an auxiliary guiderail 2, communicated with the main guiderail 1, wherein the auxiliary guiderail 2 is suspended in the air by the support frame, one end of the support frame is configured to fix the main guiderail 1 and the auxiliary guiderail 2, and the other end is fixed on the ground or under ceiling of a building.

A gap 3 is provided at a joint between the main guiderail 1 and the auxiliary guiderail 2, and a traveling underslung robot can pass through the gap 3.

The main guiderail 1 and the auxiliary guiderail 2 in the present embodiment are laid according to a plane, and can also be laid in a three-dimensional space as required.

Figure 1:
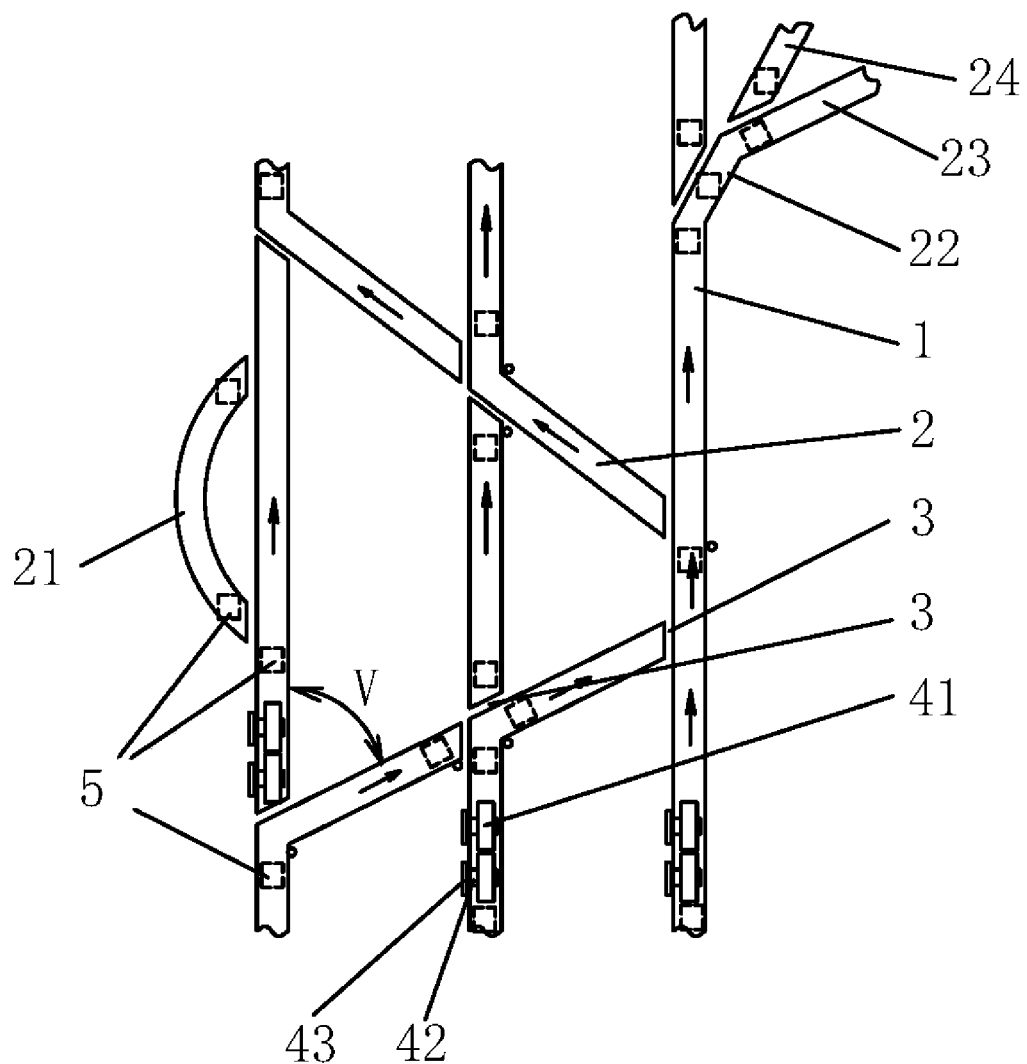
FIG. 1 is an overall structural schematic diagram of the present disclosure.
Figure 2:
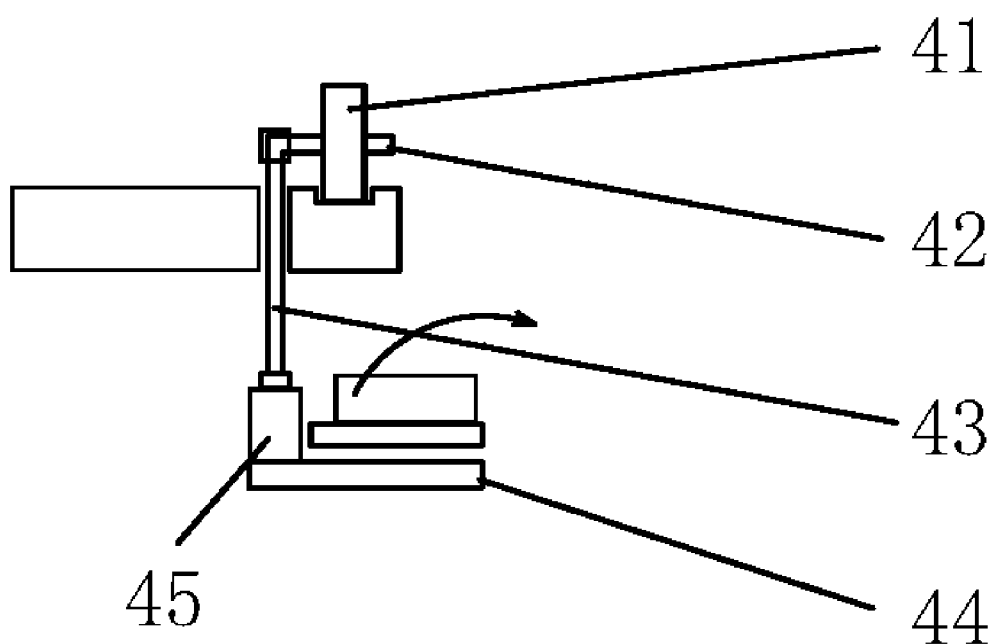
FIG. 2 is a structural schematic diagram predominated by an underslung robot of the present disclosure.

In FIG. 1, the main guiderail 1 can be continuously branched to form a first guiderail 22, a second guiderail 23 and a third guiderail 24, in which case, the main guiderail and the auxiliary guiderail are not strictly restricted, the second guiderail 23 is an auxiliary guiderail with respect to the main guiderail 1, but the second guiderail 23 in turn is a main guiderail with respect to the first guiderail 22 and the third guiderail 24.

The main guiderail 1 can also dock to form a temporary guiderail 21, and the underslung robot can drive into the temporary guiderail 21 to give way to other underslung robots on the main guiderail 1, so as to improve the utilization ratio of the guiderail.

Road sign indicators 5 are further included, each including: a bar code, a two-dimensional code, a color block mark, a figure size mark, a figure color mark and/or a figure quantity mark; the road sign indicators 5 are respectively installed on bottom surfaces of the main guiderail 1 and the auxiliary guiderail 2, and the road sign indicators 5 can be configured to allow the underslung robot to recognize where it is located.

An angle V between the main guiderail 1 and the auxiliary guiderail 2 is an acute angle, and the angle V is preferably smaller than 30 degrees.

The gap 3 is in an elongated shape, and a length direction of the gap 3 is the same as a length direction of the auxiliary guiderail 2, or the length direction of the gap 3 is the same as the length direction of the main guiderail 1.

An underslung robot, including:
wheels 41, provided in a number of two, configured to carry the underslung robot, wherein at least one wheel 41 is a power wheel controlled by a controller of the underslung robot, and the wheels 41 can roll along the main guiderail 1 or the auxiliary guiderail 2;

the power wheel includes:
a servo motor, wherein its housing is fixed with the booms 43, a main shaft of the servo motor is fixed with a main shaft of the wheels 41.

There are two booms 43. A top portion of each boom 43 is connected with the main shaft 42 of the wheels 41, a bottom portion of each boom 43 is connected with a rack 44 of the underslung robot, and at least one boom 43, driven by a power system, is rotatable relative to the rack 44, so as to be capable of controlling a traveling direction of the wheels 41. The power system is controlled by the controller of the underslung robot; when the underslung robot is designed to be capable of moving forward and backward, there are usually two power systems controlling the two booms 43 respectively.

The power system includes: a steering motor 45, whose housing is fixed with the rack 44. A rotating shaft of the steering motor 45 is fixed with the booms 43, and the steering motor 45 is controlled by a controller of the underslung robot.

When the underslung robot travels from the main guiderail 1 to the auxiliary guiderail 2, or travels from the auxiliary guiderail 2 to the main guiderail 1, the booms 43 can pass through the gap 3. The booms 43 can be designed in a sheet shape.

It further includes:
a road sign collecting sensor, wherein a camera is chosen as the road sign collecting sensor, and it is installed on a main structure of the underslung robot, can be aligned with the road sign indicators 5 mounted on the bottom surfaces of the main guiderail 1 and the auxiliary guiderail 2 to collect information. The road sign collecting sensor is connected with the controller of the underslung robot.

An operating system of an underslung robot, including the above guiderail for an underslung robot and the above underslung robot, and further including:
a server, which is in wireless communication with a plurality of underslung robots, wherein the server can control the underslung robots to move forward, move backward and/or turn to make the underslung robots capable of unloading goods in a designated position.

What is claimed is:
1. A guiderail for an underslung robot, comprising:
a main guiderail, suspended in the air by a support frame;
an auxiliary guiderail, communicated with the main guiderail, wherein the auxiliary guiderail is suspended in the air by the support frame;
a gap, provided at a joint between the main guiderail and the auxiliary guiderail, wherein the underslung robot is configured to pass through the gap in traveling; and
road sign indicators, which are respectively installed on the main guiderail and the auxiliary guiderail, wherein the road sign indicators are configured to allow the underslung robot to recognize where it is located, and each of the road sign indicators comprises: a two-dimensional code, a color block mark, a figure size mark, a figure color mark and/or a figure quantity mark, wherein the main guiderail and the auxiliary guiderail are laid in a plane, or laid in a three-dimensional space, wherein the main guiderail docks to form a first guiderail for use by the underslung robot so as to improve utilization of the guiderail.

2. The guiderail for an underslung robot according to claim 1, wherein an angle V between the main guiderail and the auxiliary guiderail is an acute angle.

3. The guiderail for an underslung robot according to claim 2, wherein the angle V is smaller than 30 degrees.

4. The guiderail for an underslung robot according to claim 1, wherein the gap is in an elongated shape, and a length direction of the gap is the same as a length direction of the auxiliary guiderail, or the length direction of the gap is the same as a length direction of the main guiderail.

5. The guiderail for an underslung robot according to claim 1, wherein the support frame has one end on which the main guiderail and the auxiliary guiderail are to be fixed, and the other end fixed on a ground or under a ceiling of a building.

6. An underslung robot, comprising:
wheels, provided in a number of two, configured to carry the underslung robot, wherein at least one of the wheels is a power wheel and the power wheel is controlled by a controller of the underslung robot, and the wheels are configured to roll along the main guiderail or the auxiliary guiderail of the guiderail for an underslung robot according to claim 1; and
booms, provided in a number of two, wherein a top portion of each of the booms is connected with one of the wheels, a bottom portion of each of the booms is connected with a rack of the underslung robot, at least one of the booms, driven by a power system, is rotatable relative to the rack, so as to control a traveling direction of each of the wheels, and the power system is controlled by the controller of the underslung robot,
wherein when the underslung robot travels from the main guiderail to the auxiliary guiderail, or travels from the auxiliary guiderail to the main guiderail, the booms is configured to pass through the gap.

7. The underslung robot according to claim 6, further comprising:
a road sign collecting sensor, installed inside the underslung robot and configured to collect information indicated by the road sign indicators, wherein the road sign collecting sensor is connected with the controller of the underslung robot, and the road sign collecting sensor comprises a camera.

8. The underslung robot according to claim 7, wherein the power system comprises:
a steering motor, whose housing is fixed with the rack, wherein a rotating shaft of the steering motor is fixed with each of the booms, and the steering motor is controlled by the controller of the underslung robot.

9. The underslung robot according to claim 7, wherein the power wheel comprises:
a servo motor, whose housing is fixed with each of the booms, wherein a main shaft of the servo motor is fixed with a main shaft of each of the wheels.

10. An operating system of an underslung robot, comprising the guiderail for an underslung robot according to claim 1 and the underslung robot according to claim 6, and further comprising:
a server, which is in wireless communication with a plurality of underslung robots, wherein the server is configured to control the underslung robots to move forward, move backward and/or turn to make the underslung robots capable of unloading goods in a designated position.

11. The operating system of an underslung robot according to claim 10, wherein an angle V between the main guiderail and the auxiliary guiderail is an acute angle.

12. The operating system of an underslung robot according to claim 11, wherein the angle V is smaller than 30 degrees.

13. The operating system of an underslung robot according to claim 10, wherein the gap is in an elongated shape, and a length direction of the gap is the same as a length direction of the auxiliary guiderail, or the length direction of the gap is the same as a length direction of the main guiderail.

14. The operating system of an underslung robot according to claim 10, wherein the support frame has one end on which the main guiderail and the auxiliary guiderail are to be fixed, and the other end fixed on a ground or under a ceiling of a building.

15. The operating system of an underslung robot according to claim 10, wherein the underslung robot further comprises a road sign collecting sensor, installed inside the underslung robot and configured to collect information indicated by the road sign indicators, wherein the road sign collecting sensor is connected with the controller of the underslung robot, and the road sign collecting sensor comprises a camera.

16. The operating system of an underslung robot according to claim 15, wherein the power system comprises a steering motor, whose housing is fixed with the rack, wherein a rotating shaft of the steering motor is fixed with each of the booms, and the steering motor is controlled by the controller of the underslung robot.

17. The operating system of an underslung robot according to claim 15, wherein the power wheel comprises a servo motor, whose housing is fixed with each of the booms, wherein a main shaft of the servo motor is fixed with a main shaft of each of the wheels.

* * * * *